United States Patent Office 3,050,452
Patented Aug. 21, 1962

3,050,452
PREPARATION OF ORGANIC SULFUR COMPOUNDS
Rector P. Louthan, Bartlesville, Okla., assignor to Phillips Petroleum Company, a corporation of Delaware
No Drawing. Filed Aug. 8, 1960, Ser. No. 47,930
16 Claims. (Cl. 204—162)

This invention relates to the preparation of organic sulfur compounds. More particularly, it relates to the preparation of mercaptans and/or thio-ethers by reacting hydrogen sulfide with ethylenically unsaturated compounds in the presence of ultraviolet radiation and a novel reaction promoter.

The preparation of mercaptans and thio-ethers (sulfides) by reacting hydrogen sulfide with organic compounds containing ethylenic linkages is well known in the art. When this reaction is carried out photochemically in the presence of ultraviolet radiation, the addition of the sulfhydryl group, —SH, to the unsaturated compound occurs in an abnormal manner, i.e., contrary to the course suggested by the Markownikoff rule; that is, the sulfhydryl group becomes affixed to the unsaturated carbon atom holding the most hydrogen atoms, and the hydrogen atom becomes affixed to that unsaturated carbon atom carrying the lesser number of hydrogen atoms. This abnormal conversion reaction is well known in the art and it has been used to form mercaptans and thio-ethers, such as those used in insecticide and repellent compositions, etc. However, the conversion of the unsaturated compound by this reaction is often of a low order, and many unsaturated compounds, such as ethylene, are not readily converted while others require an induction period before any appreciable conversion results. Also, the yields of mercaptans and/or thio-ethers when prepared according to this known photochemical process have not been as great as desired.

Accordingly, an object of this invention is to provide a novel method for preparing organic sulfur compounds. Another object is to provide a novel method of preparing mercaptans and/or thio-ethers by reacting hydrogen sulfide with ethlenically unsaturated compounds in the presence of ultraviolet radiation and a novel reaction promoter. Another object is to increase the conversion of ethylenically unsaturated organic compounds in the reaction of the same with hydrogen sulfide in the presence of ultraviolet radiation. Another object is to increase the rate of reaction between such unsaturated compounds and hydrogen sulfide, and to increase the yield of mercaptans and/or thio-ethers produced thereby.

In its broader aspects, my invention resides in the discovery that the photochemical reaction of ethylenically unsaturated compounds and hydrogen sulfide in the presence of ultraviolet radiation can be substantially promoted by carrying out said reaction in the presence of an organic trialkyl phosphite such as those having the general formula $(RO)_3P$, wherein R is an alkyl radical having from 1 to 10 carbon atoms, and preferably where each R is the same normal alkyl radical having 1 to 5 carbon atoms. By carrying out said reaction in the presence of my novel reaction promoters, I have found that the conversion of the unsaturated compound is substantially increased, as well as the rate of reaction, and that increased yields of mercaptans and/or thio-ethers are obtained.

Representative phosphite reaction promoters useful in the practice of this invention include trimethyl phosphite, triethyl phosphite, tripropyl phosphite, tributyl phosphite, tripentyl phosphite, dimethyl ethyl phosphite, diethyl methyl phosphite, methyl ethyl propyl phosphite, dimethyl propyl phosphite, diethyl butyl phosphite, dibutyl propyl phosphite, trihexyl phosphite, triheptyl phosphite, trioctyl phosphite, trinonyl phosphite, tridecyl phosphite, dihexyl octyl phosphite, hexyl heptyl octyl phosphite, dihexyl nonyl phosphite, dimethyl decyl phosphite, didecyl pentyl phosphite, triisopropyl phosphite, triisopentyl phosphite, triisobutyl phosphite, dimethyl isobutyl phosphite, diethyl isooctyl phosphite, and the like.

The ethylenically unsaturated compounds which may be reached with hydrogen sulfide according to this invention include those with one or more ethylenic linkages, although those generally applicable will have a total of from 2 to 20 atoms per molecule and 1 to 3 ethylenic linkages. Such unsaturated compounds include acyclic and cyclic olefins, and the like. Representative unsaturated compounds useful in the practice of this invention include ethylene, propylene, butene-1, butene-2, isobutene, pentene-1, pentene-2, hexene-1, heptene-1, octene-1, decene-1, dodecene-1, pentadecene-1, heptadecene-1, eicosene-1, isopentene-1, 4-methyl-1-pentene, 3,6-dimethyl-1-heptene, 7-methyl-4-nonene, 4-methyl-5-butyl-4-decene, 1,4 - diphenyl - 2 - butene, 3 - cyclohexyl - 6 - eicosene, 4,4 - dimethyl - 1 - pentene, 4 - methyl - 2 - pentene, 2,4,4-trimethyl-2-pentene, cyclopentene, 3-ethylcyclopentene, 2,5-diethylcyclopentene, cyclohexene, 3-ethylcyclohexene, 2-ethyl-4-methyl-5-heptyl-6-butylcyclohexene, cycloheptene, cyclooctene, 4-vinylcyclohexene, 3-ethyl-5-vinylcyclohexene, 4-(1-cyclohexenyl) butene-1, 4-vinylcyclopentene, 1-methyl-2-dodecyl-4-vinylcyclopentene, 1,5,9-cyclododecatriene, and the like.

In addition to the above-named unsaturated hydrocarbons, the process of the invention can be employed to effect an increased rate of reaction of $H_2S$ with ethylenically unsaturated compounds containing non-hydrocarbon groups. For example, the above named ethylenically unsaturated hydrocarbons can be substituted by such groups as halogens, particularly chlorine and bromine, hydroxyl, alkoxy carboxy, carboalkoxy, alkenoxy, aralkoxy, and the like. Some specific examples of compounds of this type are vinyl chloride, vinyl bromide, allyl chloride, dodecenyl chloride, 2-chloroeicosene-2, allyl alcohol, cyclohexenyl alcohol, octenyl alcohol, 2-butene-1,4-diol, 4-hydroxydodecene-2, 6-hydroxyeicosene, 7-hydroxy-1,4-octadiene, 4-ethoxy-pentene-2, 3-pentoxycyclohexene, methyl vinyl ether, divinyl ether, benzyl allyl ether, benzyl eicosenyl ether, 2-butenyl phenylethyl ether, acrylic acid, ethyl acrylate, methyl methacrylate, maleic acid, linoleic acid, linolenic acid, oleic acid, and the like.

Typical and representative of the various mercaptans and/or thioethers which can be produced according to this invention include ethyl mercaptan, propyl mercaptan, cyclohexyl mercaptan, diethyl thioether, dipropyl thioether, dicyclohexyl thioether, butyl mercaptan, dibutyl thioether, dodecyl mercaptan, dipentadecyl thioether, eicosyl mercaptan, 4-methyl-n-pentyl mercaptan, cyclooctyl mercaptan, 1,5,9 - trimercaptocyclododecatriene, 3 - chloropropyl mercaptan, 2 - bromoethyl mercaptan, 2-mercaptobutane-1,4-diol, 3-mercaptopropionic acid, thioglycollic acid, ethyl 3-mercaptopropionate, 2-mercaptobutane-1,4-dioic acid, bis(2-mercaptoethyl) ether, 2- mercaptoethyl benzyl ether, and the like.

Although the reaction described herein can be carried out by using the whole range of ultraviolet radiations, i.e., wavelengths in the range of 100 to 3800 Angstrom units, ultraviolet radiations having wavelengths below about 2900 Angstrom units are preferred. The amount of radiation can vary over a wide range and will be dependent upon many factors, such as the particular unsaturated compound used as a reactant and the amount thereof, the source of radiation, the particular promoter used, and other considerations. Generally, however, the rate of ultraviolet radiation, expressed in terms of rep.

(roentgen equivalent physical) per hour will be in the range between $1 \times 10^3$ to $1 \times 10^{10}$, and the total radiation or dosage will generally be in the range between $1 \times 10^5$ and $1 \times 10^{11}$ rep. Any suitable source of radiation providing wavelengths in the ultraviolet range can be used, including such common sources as mercury lamps, and hydrogen discharge tubes. The particular reaction vessel used should be transparent in whole or part, to ultraviolet radiation of the desired wavelengths, and materials such as Pyrex, Vycor and quartz can be used.

The reaction of this invention can be carried out in a manner like that of the prior art, and may be effected in a batch, intermittent, or continuous manner. The reaction temperature can vary over a wide range, and generally will be within −50 and 300° F., although the upper limit is dictated only by pressure, since some of the lower molecular weight unsaturated reactants will have an extremely high vapor pressure which will entail the use of high pressure vessels if the reaction is carried out at temperatures outside of this range. The pressure at which the reaction is carried out will also vary and generally will be the equilibrium pressure of the reaction mixture at the chosen reaction temperature. Generally speaking, the reaction times will also vary and can be carried out, for example, within the range between 1 and 5 hours.

After reaction is completed, the products of reaction can be recovered by well-known means. For example, gases can be recovered or released to the atmosphere and the liquid product fractionated, distilled, crystallized, or subjected to various other separation and recovery procedures to obtain the desired products.

The amount of the novel phospite reaction promoter used in this invention will also vary over a wide range and it will be dependent upon various factors, such as the particular phosphite used, the particular unsaturated compound used as a reactant, etc. Stated functionally, the amount of trialkyl phosphite reaction promoter used in this invention will be that amount sufficient to promote the reaction and increase the conversion of the unsaturated compound. For most applications, the amount of reaction promoter, expressed in the terms of mole ratio of reaction promoter per mole of each ethylenic linkage of the unsaturated reactant will be within the range between 0.001 and 100.

Similarly, the amount of hydrogen sulfide used will vary, and generally for most applications will be in the range between 0.4 and 4.0 moles of hydrogen sulfide per mole of each ethylenic linkage of the unsaturated reactant.

The following examples further illustrate the objects and advantages of this invention, but it should be understood that the various ingredients or reactants, amounts, temperatures, pressures, and other conditions recited in these examples should not be construed so as to unduly limit this invention.

EXAMPLE I

A number of runs were carried out in which $H_2S$ was reacted with an unsaturated compound selected from the group consisting of 2,4,4 - trimethylpentene - 1, 2,4,4 - trimethylpentene-2 and 4-vinylcyclohexene-1, in the presence of ultra-violet radiation.

These runs were carried out in a 500 cc. stainless steel reactor which was fabricated from a 3-inch stainless steel pipe, approximately 6 inches long. A 33 mm. I.D. quartz tube was sealed into both ends of the reactor so that the reaction solution could be contained in the annular space between the quartz tube and the inside of the stainless steel pipe. The reactor was equipped with a pressure guage, a thermowell and a cooling coil through which tap water flowed. Inlet tubes with valves were provided in order to charge the reactants.

In each run, the unsaturated compound and the phosphite promoter, when used, were charged to the reactor, after which the charged reactor was weighed. A slight excess of the required hydrogen sulfide was charged, and the reactor was returned to the scales where hydrogen sulfide was bled from the reactor until the correct weight was obtained. The charged reactor was then mounted on a shaker, a lighted 100 watt mercury vapor lamp was inserted in the quartz tube, and the shaker started. In all of these runs, an irradiation time of 120 minutes was employed. At the end of the irradiation period, the reaction solution was removed from the reactor and distilled to determine the conversion and the product distribution. No effort was made to recover the unreacted hydrogen sulfide. This material was allowed to weather off when the reaction solution was removed from the reactor. The results of these runs are expressed below as Tables I, II and III.

Table I summarizes the results from the reaction of hydrogen sulfide with 2,4,4-trimethylpentene-1, Table II summarizes the results from the reaction of $H_2S$ with 2,4,4-trimethylpentene-2, and Table III summarizes the results from the reaction of $H_2S$ with 4-vinylcyclohexene-1. In the runs of Tables I and II, 224 grams of the unsaturated compound was utilized in each run and 74 grams of hydrogen sulfide was utilized in each run. The amounts of unsaturated compound and $H_2S$ in each run with 4-vinylcyclohexene-1 are reported in Table III.

*Table I*

| Run no. | Phosphite derivative | Amount of phosphite derivative (ml.) | Moles of phosphite derivative | Temp., (° F.) | Pressure (p.s.i.g.) | Conversion of unsaturated reactant (percent) | Wt. ratio of products (RSH/RSR)[1] |
|---|---|---|---|---|---|---|---|
| 1 | None | | 0 | 86–90 | 155–123 | 38.8 | 82.3/17.7 |
| 2 | Trimethyl | 1.0 | 0.00844 | 75–86 | 138–85 | 68.8 | 75.1/24.9 |
| 3 | do | 2.0 | 0.01688 | 89–91 | 155–88 | 72.8 | 72.0/28.0 |
| 4 | do | 4.0 | 0.03376 | 85–90 | 155–79 | 77.6 | 70.8/29.2 |
| 5 | Triethyl | 2.0 | 0.01168 | 82–89 | 150–89 | 70.2 | 73.4/26.6 |
| 6 | Triisopropyl | 2.0 | 0.00866 | 84–89 | 153–88 | 73.8 | 71.6/28.4 |
| 7 | Tri-n-butyl | 2.0 | 0.00704 | 80–88 | 144–88 | 67.5 | 74.0/26.0 |

[1] RSH=2,4,4-trimethylpentyl mercaptan; RSR=di(2,4,4-trimethylpentyl) sulfide.

*Table II*

| Run no. | Phosphite derivative | Amount of phosphite derivative (ml.) | Temp., (° F.) | Pressure (p.s.i.g.) | Conversion of unsaturated reactant (percent)[a] |
|---|---|---|---|---|---|
| 1 | None | | 83–89 | 149–142 | 15.2 |
| 2 | Trimethyl | 1.0 | 85–89 | 151–126 | 32.3 |
| 3 | do | 2.0 | 86–90 | 159–140 | 30.9 |
| 4 | do | 4.0 | 80–89 | 148–123 | 36.3 |
| 5 | Triethyl | 2.0 | 84–89 | 150–139 | 28.4 |
| 6 | Triisopropyl | 2.0 | 80–88 | 154–150 | 19.2 |
| 7 | Tri-n-butyl | 2.0 | 87–90 | 155–136 | 30.4 |

[a] As is the case with most secondary olefins, the product was essentially all 2,2,4,4-tetramethyl-pentane-3-thiol. No sulfide was isolated.

*Table III*

| Run no. | Unsat. react. (gms.) | H₂S (gms.) | Mole ratio of reactants (H₂S/unsat. react.) | Amount of trimethyl phosphite (ml.) | Temp. (° F.) | Pressure (p.s.i.g.) | Conversion of unsat. reactant (percent) | Total product weight (gms.) | Product distribution (parts by weight) | | |
|---|---|---|---|---|---|---|---|---|---|---|---|
| | | | | | | | | | Monomercaptan | Dimercaptan | Higher boiling |
| 1 | 162 | 204 | 4.0 | None | 78–85 | 225–218 | 75.3 | 122.5 | 51.1 | 21.5 | 27.4 |
| 2 | 162 | 204 | 4.0 | 2.0 | 77–84 | 221–212 | 86.4 | 174.0 | 32.1 | 34.7 | 33.2 |
| 3 | 162 | 204 | 4.0 | 4.0 | 78–87 | 233–210 | 95.1 | 229.0 | 2.1 | 55.7 | 42.2 |
| 4 | 162 | 204 | 4.0 | 6.0 | 76–85 | 219–194 | 91.4 | 228.3 | 2.2 | 56.6 | 41.2 |
| 5 | 135 | 255 | 6.0 | 4.0 | 77–90 | 258–250 | 93.3 | 194.0 | 0 | 66.5 | 33.5 |

The data of Tables I, II, and III show in each case that when the reaction was carried out in the presence of a reaction promoter of this invention the conversion of the unsaturated compound or reactant was materially greater than that obtained by carrying out the reaction in the absence of such promoter.

EXAMPLE II

A number of runs were also carried out in which $H_2S$ was reacted with ethylene in the presence of ultraviolet radiation.

In these runs, a 1.5 gallon stainless steel reactor which was equipped with a stirrer, an internal cooling coil, a thermowell and a 33 mm. I.D. quartz tube for admitting ultraviolet radiation was employed. These runs were carried out by charging all of the hydrogen sulfide together with the phosphite promoter, when used, to the reactor, and then charging ethylene continuously from a weighed cylinder until the pressure in the reactor reached about 375 p.s.i.g. A 450 watt mercury vapor lamp was then inserted in the quartz tube and lighted. When the ultraviolet radiation reached sufficient intensity to start reaction, as indicated by a temperature rise accompanied by a pressure decrease, additional ethylene was charged continuously at such a rate as to maintain the pressure in the reactor at 410±10 p.s.i.g. This was accomplished by adjusting the pressure regulator on the ethylene cylinder at slightly above 400 p.s.i.g. The ethylene flow was continued until the predetermined amount of ethylene had been added or until the end of a 150 minute irradiation period, depending upon which occurred first. At the end of the irradiation period, the unreacted ethylene and hydrogen sulfide were vented, and the liquid product was removed from the reactor and distilled. The ratio of products was then determined. The two products which result from the reaction of $H_2S$ and ethylene were ethyl mercaptan and diethyl sulfide. The results of these runs are expressed below as Table IV.

EXAMPLE III

In this example, 1.1 moles of hydrogen sulfide was reacted with 1 mole of butene-1 for 15 minutes in the presence of ultraviolet light, in the manner described in Example I. A conversion of 38.4% of the butene-1 was obtained, and the weight ratio of mercaptan/sulfide in the product was 62.0/38.0. Under the same conditions plus 1.0 ml. of trimethyl phosphite per mole of butene-1, conversion was increased to 59.3% and a product ratio of 51.2/48.8 of mercaptan/sulfide was obtained.

EXAMPLE IV

In another run, butene-1 was reacted with $H_2S$ in the presence of ultraviolet light and trimethyl phosphite in a continuous manner.

In this run, 280 grams of butene-1, 340 grams of $H_2S$ and 5 cc. of trimethyl phosphite were charged to a charge tank, and the tank was then pressured to 500 p.s.i.g. with hydrogen. The reactants were then metered through a reactor in which a quartz tube was mounted through which light from a mercury tube passed. The effluent from the reactor passed through a motor valve to effect pressure reduction, and thence to a receiver. Unconverted product flashed off from the receiver. After a total time of 188 minutes, all of the charge had passed through the reactor, and 226 grams of products were obtained. Fractionation of the material in the receiver resulted in the recovery of 136 grams of n-butyl mercaptan and 75.9 grams of di-n-butyl sulfide. This represents a conversion, based on butene-1, of 51%.

Various modifications and alterations of this invention will become apparent to those skilled in the art from the foregoing discussion and examples, and it should be understood that this invention should not be unduly limited to that set forth herein for illustrative purposes.

I claim:

1. A process for preparing an organic sulfur compound, comprising reacting an ethylenically unsaturated compound with hydrogen sulfide in the presence of ultraviolet radiation and a trialkyl phosphite.

2. In a process for preparing an organic sulfur compound, wherein an ethylenically unsaturated compound

*Table IV*

| Run no. | H₂S (gms.) | Ethylene (gms.) | Mole ratio of reactants H₂S/Ethylene | Amt. of trimethyl phosphite (ml.) | Time to charge ethylene (min.) | Temp. (° F.) | Final Pressure (p.s.i.g.) | Ethylene converted (gms.) | Conversion of Ethylene (percent) | Wt. ratio of products (RSH/RSR) |
|---|---|---|---|---|---|---|---|---|---|---|
| 1 | 1,310 | 500 | 2.16 | None | 150 | 77–90 | 410 | 170 | 33.9 | 85.4/14.6 |
| 2 | 1,310 | 500 | 2.16 | None | 150 | 78–90 | 420 | 168 | 33.5 | 84.4/15.6 |
| 3 | 1,310 | 970 | 1.11 | 35 | 150 | 76–90 | 400 | 497 | 51.2 | 72.8/27.2 |
| 4 | 1,310 | 980 | 1.10 | 35 | 100 | 78–92 | 220 | 759 | 77.4 | 59.7/40.3 |
| 5 | 1,310 | 980 | 1.10 | 35 | 57 | 79–97 | 100 | 862 | 88.0 | 52.8/47.2 |
| 6 | 1,310 | 980 | 1.10 | 35 | 136 | 77–91 | 335 | 637 | 65.0 | 68.0/32.0 |
| 7 | 1,310 | 980 | 1.10 | 35 | 55 | 77–102 | 100 | 911 | 93.0 | 54.0/46.0 |
| 8 | 1,310 | 360 | 2.99 | None | 150 | 74–86 | 420 | 139 | 38.7 | 88.8/11.2 |
| 9 | 1,310 | 550 | 1.96 | None | 150 | 75–89 | 415 | 189 | 34.4 | 85.5/14.5 |
| 10 | 1,310 | 980 | 1.10 | 35 | 85 | 75–86 | 185 | 797 | 81.3 | 62.5/37.5 |
| 11 | 2,380 | 980 | 2.0 | 35 | 58 | 72–ᵇ | 160 | 863 | 88.1 | 73.5/26.5 |
| 11 ᵃ | 1,190 | 1,960 | 0.50 | 35 | 133 | 68–88 | 20 | 1,925 | 98.2 | 3.4/96.6 |

ᵃ The irradiation time for this run was 270 minutes rather than 150 minutes used in preceding runs.
ᵇ Temperature indicator did not function properly during part of run.

The data of Table IV also shows that a material increase in conversion of the unsaturated compound (i.e., ethylene) results when the reaction is carried out in the presence of a reaction promoter of this invention.

is reacted with hydrogen sulfide in the presence of ultraviolet radiation, and said sulfur compound is recovered from the resulting reaction, mixture, the improvement comprising carrying out said reaction in the presence of a reaction promoter of the general formula $(RO)_3P$ wherein R is an alkyl radical having from 1 to 10 carbon atoms, and recovering said sulfur compound from the resulting reaction mixture.

3. In a process according to claim 2, wherein each of said R's in said general formula is a normal alkyl radical having from 1 to 4 carbon atoms.

4. In a process according to claim 2, wherein said ethylenically unsaturated compound has a total of from 2 to 20 carbon atoms per molecule and from 1 to 3 ethylenic linkages per molecule, and is selected from the group consisting of acyclic and cyclic olefins.

5. In a process according to claim 1 wherein the mole ratio of said reaction promoter to each ethylenic linkage of said ethylenically unsaturated compound is within the range from about 0.1 to 100.

6. In a process according to claim 1 wherein the mole ratio of said hydrogen sulfide to each ethylenic linkage of said ethylenically unsaturated compound is within the range from about 0.4 to 4.0.

7. In a process according to claim 2, wherein said reaction promoter is trimethyl phosphite.

8. In a process according to claim 2, wherein said reaction promoter is triethyl phosphite.

9. In a process according to claim 2, wherein said reaction promoter is triisopropyl phosphite.

10. In a process according to claim 2, wherein said reaction promoter is tri-n-butyl phosphite.

11. In a process according to claim 2, wherein said ethylenically unsaturated compound is ethylene.

12. In a process according to claim 2, wherein said ethylenically unsaturated compound is trimethylpentene.

13. In a process according to claim 2, wherein said ethylenically unsaturated compound is 4-vinylcyclohexene-1.

14. In a process according to claim 2, wherein said ethylenically unsaturated compound is butene-1.

15. In a process according to claim 2, wherein said ethylenically unsaturated compound is an acyclic olefin.

16. In a process according to claim 2, wherein said ethylenically unsaturated compound is a cycloaliphatic compound.

References Cited in the file of this patent

UNITED STATES PATENTS

| 2,376,675 | Evans et al. | May 22, 1945 |
| 2,724,718 | Stiles et al. | Nov. 22, 1955 |

FOREIGN PATENTS

| 567,524 | Great Britain | Feb. 19, 1945 |